(12) United States Patent
Shirvinski, Sr.

(10) Patent No.: US 8,851,474 B2
(45) Date of Patent: Oct. 7, 2014

(54) JUNGLE BOCCE GAME

(71) Applicant: Joseph Charles Shirvinski, Sr., Barnesville, PA (US)

(72) Inventor: Joseph Charles Shirvinski, Sr., Barnesville, PA (US)

(*) Notice: Subject to any disclaimer, the term of this patent is extended or adjusted under 35 U.S.C. 154(b) by 98 days.

(21) Appl. No.: 13/726,512

(22) Filed: Dec. 24, 2012

(65) Prior Publication Data

US 2013/0270767 A1   Oct. 17, 2013

Related U.S. Application Data

(60) Provisional application No. 61/624,506, filed on Apr. 16, 2012.

(51) Int. Cl.
| | | |
|---|---|---|
| A63F 7/00 | (2006.01) |
| A63B 67/00 | (2006.01) |
| A63B 43/00 | (2006.01) |
| A63F 13/00 | (2014.01) |
| A63B 67/06 | (2006.01) |
| A63C 19/04 | (2006.01) |
| A63F 1/04 | (2006.01) |
| A63B 71/06 | (2006.01) |
| A63B 39/00 | (2006.01) |
| A63B 43/04 | (2006.01) |

(52) U.S. Cl.
CPC ....... *A63B 67/002* (2013.01); *A63F 2001/0441* (2013.01); *A63B 43/002* (2013.01); *A63B 2071/0625* (2013.01); *A63F 13/00* (2013.01); *A63B 43/008* (2013.01); *A63B 2039/003* (2013.01); *A63B 2209/00* (2013.01); *A63B 67/066* (2013.01); *A63B 43/04* (2013.01); *A63C 19/04* (2013.01); *A63B 2071/0694* (2013.01); *A63F 2250/21* (2013.01)

USPC .................................................... 273/118 R

(58) Field of Classification Search
USPC ..................................................... 273/118 R
See application file for complete search history.

(56) References Cited

U.S. PATENT DOCUMENTS

| | | | | |
|---|---|---|---|---|
| 2,126,245 | A | * | 8/1938 | Darby ............................ 473/589 |
| 3,119,619 | A | * | 1/1964 | Frank ............................. 273/336 |
| 3,201,128 | A | * | 8/1965 | Palovik ......................... 473/572 |
| 3,596,911 | A | * | 8/1971 | Kessler ...................... 273/123 R |
| 3,690,664 | A | * | 9/1972 | Gary et al. ................. 273/127 D |
| 4,103,894 | A | * | 8/1978 | McCraw .................... 273/126 A |
| 4,202,682 | A | * | 5/1980 | Black .............................. 65/413 |
| 4,203,592 | A | * | 5/1980 | Quatkemeyer ................ 273/336 |
| 5,104,130 | A | * | 4/1992 | Francin ......................... 273/348 |

(Continued)

OTHER PUBLICATIONS http://en.wikipedia.org/wiki/Bocce.*

*Primary Examiner* — Kurt Fernstrom
*Assistant Examiner* — Dolores Collins

(57) ABSTRACT

A game combines knowledge cards and exercise in rolling painted animal coconuts on a playing surface. The animal coconuts move in an unpredictable way with painted marks that identify jungle animals. A weight can be disposed inside the animal coconut to make it waddle as it rolls. A sound box can be placed inside the animal coconut so that it makes the sound of the animal that the coconut represents as it waddles down the playing surface. The playing surface can be a rug marked by a vine with starting lines for various ages, handicap, and/or skill of players. A fact or question/answer card can be read before a player can roll their animal coconut. A shag rug is used to slow down the animal coconut as it is heading to score. The game allows a person to affirmatively answer the question, "Have you rolled a coconut?"

12 Claims, 4 Drawing Sheets

(56) References Cited

U.S. PATENT DOCUMENTS

| | | | |
|---|---|---|---|
| 5,110,139 A * | 5/1992 | Baumgartner | 273/400 |
| 5,125,669 A * | 6/1992 | Kanda | 273/348 |
| 5,199,708 A * | 4/1993 | Lucas | 273/126 R |
| 5,536,007 A * | 7/1996 | Snyder | 273/118 R |
| 5,611,541 A * | 3/1997 | Paino | 273/317 |
| 5,639,087 A * | 6/1997 | Ogawa et al. | 273/109 |
| 6,015,151 A * | 1/2000 | Carovillano et al. | 273/317 |
| 6,932,344 B1 * | 8/2005 | Soto | 273/400 |
| 8,011,660 B1 * | 9/2011 | Butler | 273/126 R |
| 8,434,763 B2 * | 5/2013 | Butler | 273/126 R |
| 2007/0120323 A1 | 5/2007 | Liu | |
| 2013/0075972 A1 * | 3/2013 | Payer | 273/317 |

* cited by examiner

JUNGLE BOCCE GAME

CROSS-REFERENCE TO RELATED APPLICATION

This application claims the benefit of priority of U.S. Provisional Application No. 61/624,506, filed Apr. 16, 2012, the contents of which are herein incorporated by reference.

BACKGROUND OF THE INVENTION

The present invention relates to a bocce game and, more particularly, to Kokamo Joe's™ Jungle Bocce game where coconuts are rolled on a playing surface after answering a question on a knowledge card.

Typically bocce games often use round metal or plastic colored balls to get their balls closest to the jack ball. Various strategies and much skill can be used to play a typical bocce game. There is little randomness in the game and a skilled player can easily win against a novice. This can result in novice players not wanting to play, especially against those more skilled.

As can be seen, there is a need for a bocce-type game that not only uses skills in rolling an object, but where the object rolls with a wobble, making it difficult to control and predict the actual position of the object.

SUMMARY OF THE INVENTION

In one aspect of the present invention, a game comprises a first rug having a surface on which an object can roll; a second rug having a surface providing resistance to an object rolling; a plurality of oblong objects designed with different designs; a sound box button accessible from an exterior of each of the plurality of oblong objects; a sound box disposed in the plurality of oblong objects, the sound box operable to play a sound when the sound box button is depressed; and a plurality of playing cards having at least one of a fact and a question disposed thereupon.

In another aspect of the present invention, a game comprises a first rug having a surface on which an object can roll; a second rug having a surface providing resistance to an object rolling; a plurality of coconut-shaped objects designed with different exterior designs; a sound box button accessible from an exterior of each of the plurality of oblong objects; a sound box disposed in the plurality of coconut-shaped objects, the sound box operable to play a sound when the sound box button is depressed; a first rug sound box button attached to the first rug, the first rug sound box button operable to play a sound when depressed; a second rug sound box button attached to the second rug, the second rug sound box button operable to play a sound when depressed; and a plurality of playing cards having at least one of a fact and a question disposed thereupon.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a game that combines knowledge cards and exercise in rolling painted animal coconuts on a playing surface. The animal coconuts move in an unpredictable way with painted marks that identify jungle animals. A weight can be disposed inside the animal coconut to make it waddle as it rolls. A sound box can also be placed inside the animal coconut so that it makes the sound of the animal that the coconut represents as it waddles down the playing surface. The playing surface can be, for example, a green rug marked by a painted vine with starting lines for various ages, handicap, and/or skill level players. A fact or question/answer card can be read before a player can press their animal coconut's sound box and roll the coconut. A shag rug can be used to slow down the coconut as it is heading to score. The game allows a person to affirmatively answer the question, "Have you rolled a coconut?"

Figure 1:
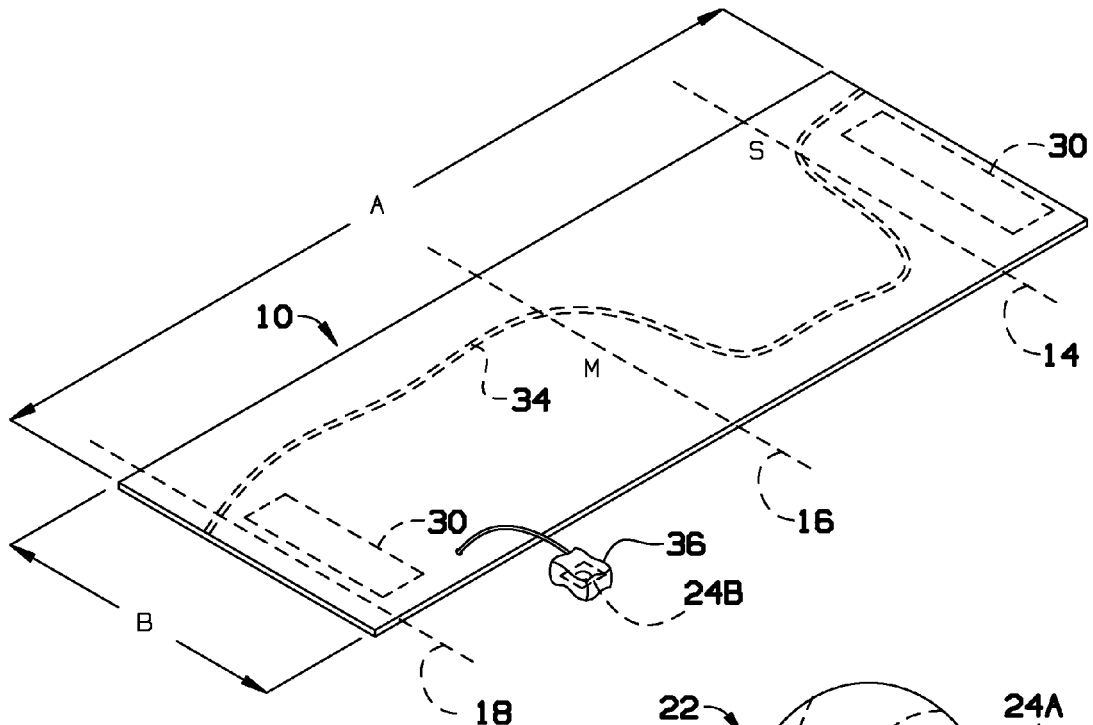
FIG. 1 is a perspective view of a jungle bocce play surface according to an exemplary embodiment of the present invention.
Figure 2:
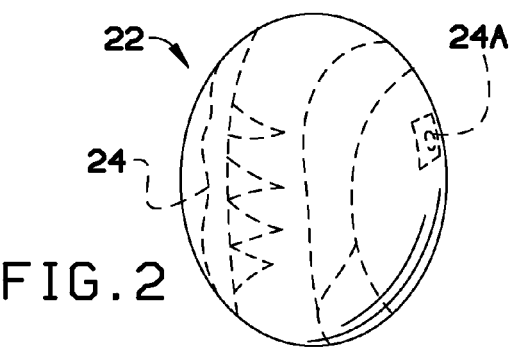
FIG. 2 is a perspective view of a coconut ball used for play on the jungle bocce play surface of FIG. 1.
Figure 3:
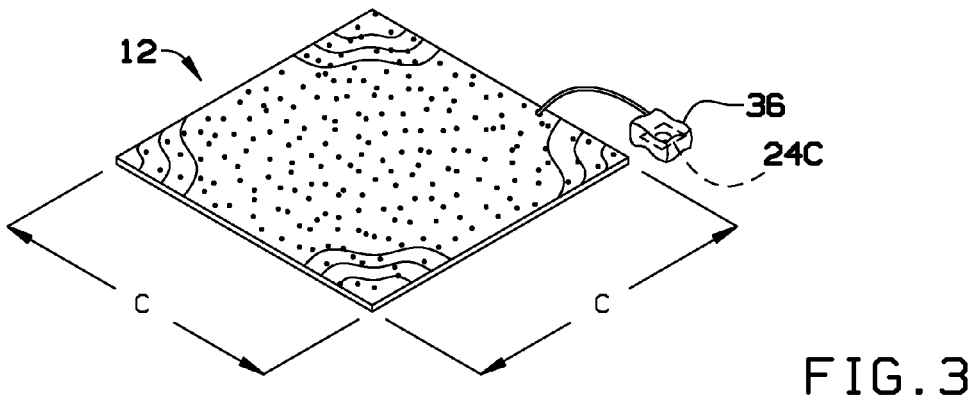
FIG. 3 is a perspective view of a sand rug used in a game played according to an exemplary embodiment of the present invention.

Referring now to FIGS. 1 and 3, a playing surface can be made from a long rug 10 and a sand rug 12. The long rug 10 can be, for example, an indoor/outdoor carpet having a vine design 34 running along its length. The long rug 10 can have a length "A" from about 6 to about 12 feet long, or longer, typically about 8 feet long, and a width "B" from about 2 to about 4 feet wide, typically about 3 feet wide. The sand rug 12 can be a shag style rug that can help slow down objects rolled thereupon. The sand rug 12 can be a rectangular rug having a length and width "C" from about 3 to about 5 feet, typically, the sand rug 12 is a square rug having a length and width "C" of about 4 feet. A logo region 30 can be formed on each end of the long rug 10.

A sponge 36 can cover a playing surface sound box button 24B connected to the long rug 10. Another sponge 36 can cover a sand rug sound box button 24C connected to the sand rug 12. Depressing the buttons 24B, 24C can generate a sound.

A animal coconut ball 22 can be formed of a coconut, for example.

However, in some embodiments, the animal coconut ball 22 can be form of a different material, such as a plastic, metal or the like. The animal coconut ball 22 can be formed in an uneven, oblong shape so that, when rolled, the animal coconut ball 22 can wobble down the playing surface. The animal coconut ball 22 can include an animal design 24 disposed thereupon. The animal design 24 can be, in some embodiments, painted on the surface of the animal coconut ball 22. An animal sound box with a button 24A can be disposed on the animal coconut ball 22. When depressed, the button 24A can cause an animal sound that matches the animal design 24 disposed on the animal coconut ball 22.

Figure 4:
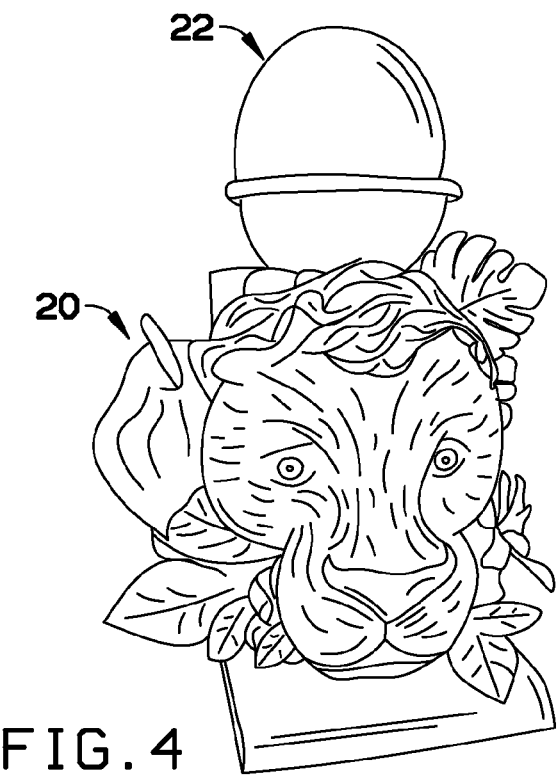
FIG. 4 is a perspective view of an exemplary trophy for a winner of the game.

Referring now to FIG. 4, a king of the jungle trophy 20 can be provided to display the animal coconut ball 22 of the winner of the game. The winner can be determined, for example, by playing the game as described below.

Figure 5:
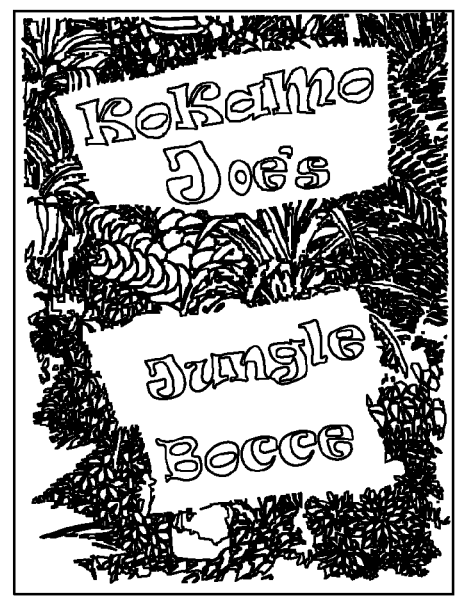
FIG. 5 is a front view of the cards used in the game of the present invention as shown in FIGS. 5A through 5C.
Figure 5A:
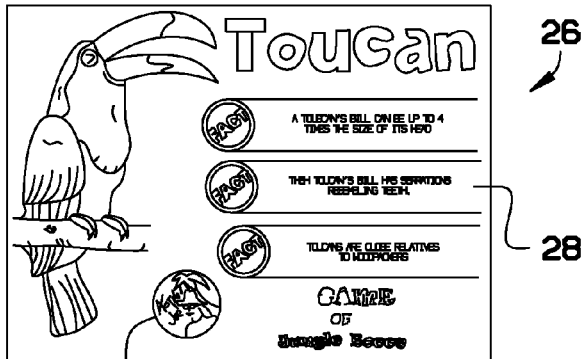
FIG. 5A is a back view of an exemplary animal information card used in the game of the present invention.
Figure 5B:
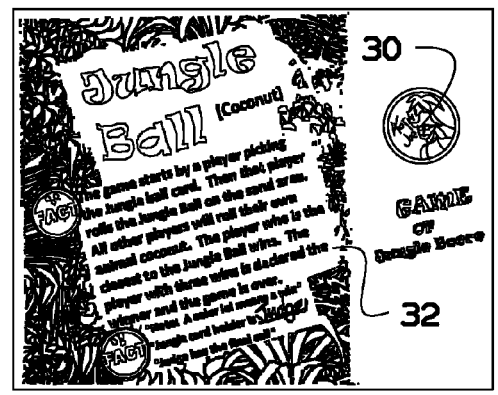
FIG. 5B is a back view of a jungle ball card used in the game of the present invention.
Figure 5C:
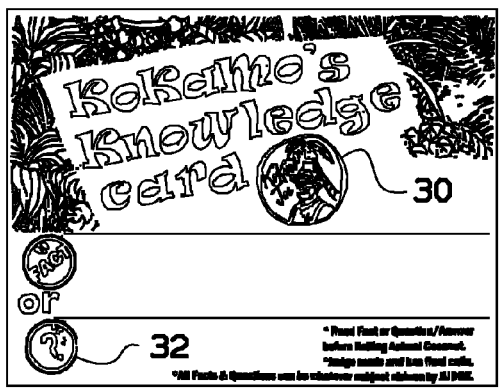
FIG. 5C is a back view of a Kokamo's knowledge card used in the game of the present invention.

Referring now to FIGS. 5 through 5C, various cards can be provided in the game of the present invention. The cards can have a back design, for example, similar to that of FIG. 5. The various cards can include a jungle animal card 26 (FIG. 5A) which can include card fact regions 28 and a logo region 30. The various cards can include an instruction card (FIG. 5B) having a card instruction region 32 and a logo region 30. The various cards can also include a knowledge card (FIG. 5C) that can include a fact or a question that can be read and answered.

Figure 6:
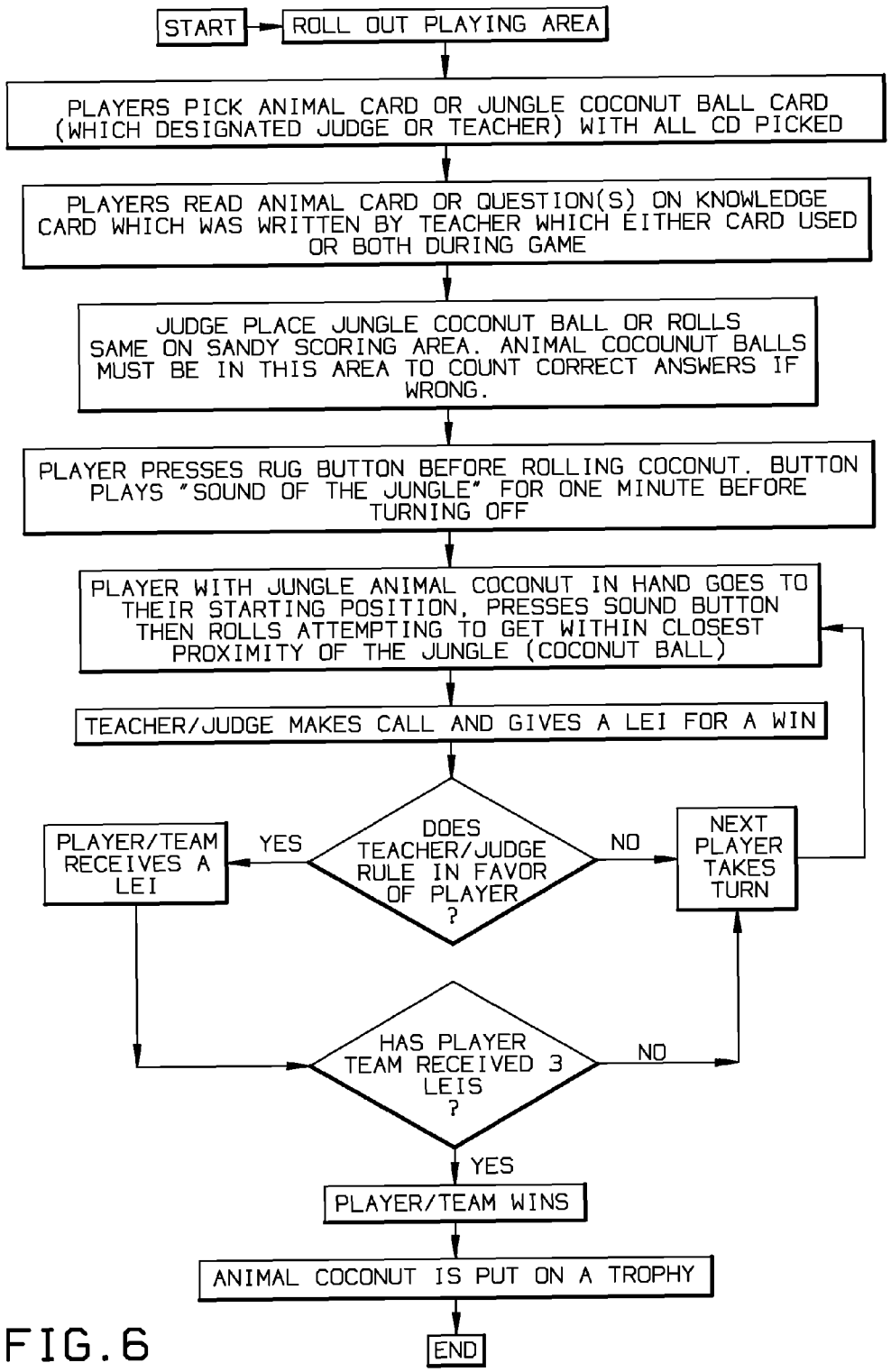
FIG. 6 is a flow chart describing game play according to an exemplary embodiment of the present invention.

Referring to FIG. 6, a method for playing the game of the present invention is described. The playing area, including the long rug 10 and the sand rug 12 can be rolled out. The players can pick an animal card or the jungle coconut ball card. In some embodiments, the judge or teacher can play the jungle coconut ball card and the other players can have animal cards. The players read their animal card or read a question on their knowledge card (which can be pre-printed on the card or can be written by the teacher on the card. For example, the card can be written on with a dry erase marker and the questions can be changed as needed.). The judge places the jungle coconut ball or rolls it on the sand rug 12 scoring area.

In some embodiments of the game, the players must answer the question on their knowledge card correctly before being allowed to roll their coconut. In other embodiments, the players can simply read a fact from a fact card before rolling their coconut. Players then press the rug sound box button 24B before rolling their coconut. The rug sound box button 24B can play, for example, sounds of the jungle, for a predetermined period of time, such as one minute, before turning off.

The player, with their jungle animal coconut in their hands, then goes to their starting position. The starting position could be starting line 14, starting line 16 or starting line 18, depending on their ability and skill level. The player then presses the sound box button 24C on their animal coconut ball 22 and rolls it, attempting to get the closest in proximity to the jungle coconut ball.

The closest player, after each player rolls their animal coconut balls 22 (if qualified by answering their question correctly, if the game so requires), wins the round and can be awarded, for example, a lei. In some embodiments, each player that has a coconut within "the jungle" (within a certain distance of the jungle coconut ball) can receive a lei after their roll. In other embodiments, each player rolls their animal coconut balls 22 and the closest receives a lei.

The rounds can continue until a player (or team) receives a certain number (such as three) of leis. This player's animal coconut ball 22 is then placed on the king of the jungle trophy 20 to indicate the winning animal coconut ball 22 and player or team.

The game concept of the present invention can be played on a rug, as described above, or may be played in a video game format. For example, in the video game format, the player can choose how to hold the animal coconut ball 22 and then "roll" it through motion of a game controller.

It should be understood, of course, that the foregoing relates to exemplary embodiments of the invention and that modifications may be made without departing from the spirit and scope of the invention as set forth in the following claims.

What is claimed is:

1. A game comprising:
a first rug having a surface on which an object can roll;
a second rug having a surface providing resistance to an object rolling;
a plurality of oblong objects designed with different designs;
a sound box button accessible from an exterior of each of the plurality of oblong objects;
a sound box disposed in the plurality of oblong objects, the sound box operable to play a sound when the sound box button is depressed; and
a plurality of playing cards having at least one of a fact and a question disposed thereupon.

2. The game of claim 1, further comprising a first rug sound box button attached to the first rug, the first rug sound box button operable to play a sound when depressed.

3. The game of claim 2, further comprising a second rug sound box button attached to the second rug, the second rug sound box button operable to play a sound when depressed.

4. The game of claim 3, wherein the first rug sound box button and the second rug sound box button are disposed in a sponge.

5. The game of claim 1, wherein the first rug is shaped as an elongated rectangle and the second rug is a square rug.

6. The game of claim 5, wherein the first rug is about 8 feet long.

7. The game of claim 1, wherein the oblong objects are coconuts.

8. The game of claim 1, wherein the first rug includes one or more start lines disposed thereupon, the start lines defining a position where a player rolls their oblong object along the first rug toward the second rug.

9. A game comprising:
a first rug having a surface on which an object can roll;
a second rug having a surface providing resistance to an object rolling;
a plurality of coconut-shaped objects designed with different exterior designs;
a sound box button accessible from an exterior of each of the plurality of oblong objects;
a sound box disposed in the plurality of coconut-shaped objects, the sound box operable to play a sound when the sound box button is depressed;
a first rug sound box button attached to the first rug, the first rug sound box button operable to play a sound when depressed;
a second rug sound box button attached to the second rug, the second rug sound box button operable to play a sound when depressed; and
a plurality of playing cards having at least one of a fact and a question disposed thereupon.

10. The game of claim 9, wherein the first rug sound box button and the second rug sound box button are disposed in a sponge.

11. The game of claim 9, wherein the first rug is shaped as an elongated rectangle and the second rug is a square rug.

12. The game of claim 9, wherein the coconut-shaped objects are coconuts.

* * * * *